3,190,894
BIS-(DIFLUOROAMINO)ANTHRACENES AND THEIR SYNTHESIS FROM N₂F₄ AND ANTHRACENES
Anestis L. Logothetis, Wilmington, Del., assignor to E. I. du Pont de Nemours and Company, Wilmington, Del., a corporation of Delaware
No Drawing. Filed Jan. 29, 1962, Ser. No. 169,645
11 Claims. (Cl. 260—396)

This invention relates to, and has as its principal objects provision of, a novel class of organic nitrogen-fluorine compounds and a method for preparing the same.

The products of this invention are 9,10-bis(difluoroamino)-9,10-dihydroanthracenes of the formula:

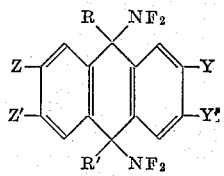

where R and R' are the same or different and are hydrogen, fluorine, chlorine, or hydrocarbyl free of aliphatic unsaturation, e.g., methyl, isopentyl, benzyl, 2,4-xylyl, α-naphthyl, and dodecyl; and Y, Y', Z, and Z' are the same or different and are hydrogen, chlorine, lower alkyl, or phenyl. Because of ease of availability, a preferred class is that defined above in which R and R', when hydrocarbyl groups, have 1–12 carbons. An especially preferred class is that in which R and R' are the same and are hydrogen, fluorine, chlorine, or hydrocarbyl of up to seven carbons free of aliphatic unsaturation, and Y, Y', Z, and Z' are hydrogen.

The products of this invention are made by reacting dinitrogen tetrafluoride ($N_2F_4$) with an anthracene compound of the formula

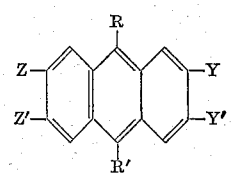

where R, R', Y, Y', Z, and Z' are as defined above. The mole ratio of the reactants is not critical. Usually, equimolar amounts of the reactants, as dictated by the stoichiometry of the reaction, or a slight excess of $N_2F_4$ is used. Unreacted $N_2F_4$ is easily removed from the product mixture by virtue of its volatility (B.P. −73° C.).

A solvent is not required, but an inert solvent can usually be used to advantage, since many of the anthracenes used in the process are solids. Suitable solvents include hydrocarbons and fluorinated or chlorinated hydrocarbons, such as benzene, heptane, cyclohexane, petroleum ether, chlorobenzene, carbon tetrachloride, perfluoro-1,2-dimethylcyclobutane, 1,2-dichloroethane, 1,1,1-trichloroethane, and 1,1,2-trichloro-1,2,2-trifluoroethane.

The reaction temperature is likewise not critical. Temperatures as low as 20° C. can be used. A practical upper limit is imposed only by the tendency of the products to dissociate. Usually temperatures in the range 30–80° C. are used.

The process is conveniently carried out at the autogenous pressure of the reactants in a closed vessel equipped with means of agitation and of measuring internal pressure. The inner surface of the vessel is resistant to chemical attack by nitrogen fluorides and hydrogen fluoride. Surfaces of stainless steel and "Hastelloy" C are suitable. "Hastelloy" C is the trade name of a well-known alloy of nickel, iron, and molybdenum.

The time required varies with the anthracene reactant and the temperatures. The course of the reaction can be followed by observing the pressure drop as the reactants combine. Under the preferred conditions, the reaction is usually complete in ½ to 12 hours. The products are separated by known procedures such as crystallization, sublimation, and chromatography.

The products are crystalline solids that can be recrystallized from common organic solvents. They are stable to air and moisture at ordinary temperatures.

The following examples illustrate the process and products of this invention.

EXAMPLE I

Cis- and trans-9,10-bis(difluoroamino)-9,10-dihydroanthracene

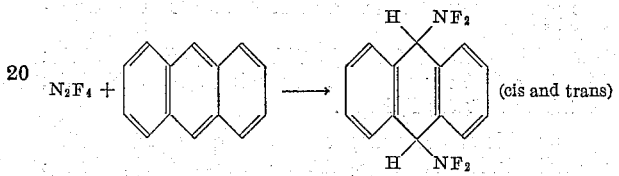

A 240-cc. "Hastelloy" C-lined shaker tube was charged with 16.0 g. of anthracene, 50 g. of benzene, and 11.0 g. of $N_2F_4$. The tube was sealed, held at 30° C. with shaking for 12 hours, and opened. The insoluble solid was separated by filtration and recrystallized from benzene to give 7.0 g. of colorless, crystalline cis-9,10-bis(difluoroamino)-9,10-dihydroanthracene, M.P. 203–204° C. with evolution of hydrogen fluoride.

Analysis.—Calcd. for $C_{14}H_{10}N_2F_4$: C, 59.54; H, 3.59; N, 9.92; F, 26.93. Found: C, 59.88; H, 3.72; N, 9.26; F, 26.88.

The infrared absorption spectrum (potassium bromide pellet) had bands at 10.2μ, 10.55μ, 10.72μ, 10.9μ, 11.17μ, and 11.56μ, characteristic of the N-F bond. The ultraviolet absorption spectrum, measured in ethyl alcohol solution, showed maxima at 273 mμ (ε=326), 267 mμ (ε=460), 261 mμ (ε=490), and 256 mμ (ε=400), characteristic of ortho-disubstituted benzenes. The $F^{19}$ n-m-r (nuclear magnetic resonance) spectrum (nitrobenzene solution) had a doublet centered at −6790 c.p.s. (56.4 mc.; 1,2-dichlorotetrafluoroethane=0; $J_{F-H}$=30 c.p.s.), the splitting being due to the adjacent hydrogen. This compound was assigned the cis configuration because of its relatively high dipole moment, 4.97D (see below).

The filtrate was evaporated under reduced pressure to give 14.0 g. of crude trans-9,10-bis(difluoroamino)-9,10-dihydroanthracene, which was recrystallized from hexane to give 10 g. of pure, colorless, crystalline product melting at 125–127° C. with evolution of hydrogen fluoride.

Analysis.—Calcd. for $C_{14}H_{10}N_2F_4$: C, 59.54; H, 3.59; N, 9.92; F, 26.93. Found: C, 59.51; H, 3.79; N, 9.90; F, 26.76.

The infrared absorption spectrum of the product (potassium bromide pellet) showed bands at 10.22μ, 10.40μ, 10.75μ, 10.94μ, 11.14μ, 11.45μ, 11.75μ, and 12.77μ, characteristic of N-F bonds; the ultraviolet absorption spectrum (ethyl alcohol solution) had a maximum at 255 mμ (ε—2620). The $F^{19}$ n-m-r spectrum showed a doublet centered at −5987 c.p.s. (56.4 mc.; 1,2-dichlorotetrafluoroethane=0; $J_{F-H}$=30 c.p.s.), the splitting being due to the adjacent hydrogen. This product was assigned the trans configuration because of its relatively low dipole moment, 270D.

Both cis and trans-9,10-bis(difluoroamino)-9,10-dihydroanthracene liberate hydrogen fluoride on heating and are therefore useful as etching agents for glass under controlled conditions at elevated temperatures.

EXAMPLE II

*9,10-dichloro-9,10-bis(difluoroamino)-9,10-dihydroanthracene*

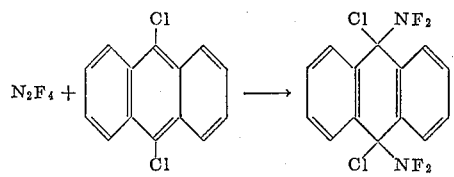

The shaker tube of Example I was charged with 30 g. of 9,10-dichloroanthracene, 60 g. of benzene, and 14 g. of $N_2F_4$. The tube was sealed, heated at 71° C. with shaking for 30 minutes, cooled, and opened. The solid in the mixture was removed by filtration, and the filtrate was evaporated under reduced pressure to give 23 g. of 9,10 - dichloro -9,10 - bis(difluoroamino)-9,10-dihydroanthracene, which was recrystallized for analysis from a 4:1 mixture of low-boiling petroleum ether and benzene. The purified product melted at 120–125° C. with evolution of $N_2F_4$.

*Analysis.*—Calcd. for $C_{14}H_8Cl_2N_2F_4$: C, 47.90; H, 2.30; Cl, 20.20; N, 7.98; F, 21.65. Found: C, 48.39; H, 2.59; Cl, 20.16; N, 7.72; F, 22.15.

The ultraviolet absorption spectrum, measured in ethyl alcohol solution, had $\lambda_{max.}$ at 273 m$\mu$ ($\epsilon$=1,500), 280 m$\mu$ ($\epsilon$=1,490), 290 m$\mu$ ($\epsilon$=147), 308 m$\mu$ ($\epsilon$=102), and 332 m$\mu$ ($\epsilon$=42). The $F^{19}$ n-m-r spectrum, measured in nitrobenzene solution, showed two single peaks at −6175 and −6075 c.p.s. (56.4 mc.; 1,2-dichlorotetrafluoroethane=0) in a 2:1 ratio, indicating the presence of cis and trans isomers. These isomers can be separated by chromatography.

EXAMPLE III

*9,10-bis(difluoroamino)-9,10-diphenyl-9,10-dihydroanthracene*

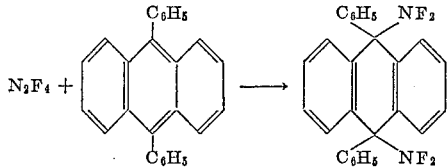

The shaker tube of Example I was charged with 15 g. or 9,10-diphenylanthracene, 30 g. of benzene, and 5.5 g. of $N_2F_4$. It was sealed, heated at 50° C. with shaking for one hour, cooled, and opened. The insoluble solid in the product mixture was removed by filtration, and the filtrate was evaporated under reduced pressure to give 1.8 g. of an approximately 1:2 mixture of 9,10-bis(difluoroamino)-9,10-diphenyl-9,10-dihydroanthracene and 9,10-diphenylanthracene. After recrystallization from hexane, the product melted at 180–200° C. with evolution of $N_2F_4$.

*Analysis.*—Calcd. for $C_{26}H_{18}N_2F_4 \cdot 2C_{26}H_{18}$: N, 2.16; F, 5.85. Found: N, 2.10; F, 6.20.

The proportion of 9,10-bis(difluoroamino)-9,10-diphenyl-9,10-dihydroanthracene in the product was determined by comparison of the ultraviolet absorption spectra of the product and of 9,10-diphenylanthracene, both measured in ethyl alcohol solution. The spectrum of the product had $\lambda_{max.}$ at 395 m$\mu$ ($K^1$=23.9), 375 m$\mu$ ($K$=25.6), 356 m$\mu$ ($K$=15.8), 339 m$\mu$ ($K$=7.1), and 262 m$\mu$ ($K$=206). The spectrum for 9,10-diphenylanthracene showed $\lambda_{max.}$ at 390 m$\mu$ ($\epsilon$=36.1), 375 m$\mu$ ($\epsilon$=38.4), 356 m$\mu$ ($\epsilon$=2.37), 339 m$\mu$ ($\epsilon$=10.3), and 262 m$\mu$ ($\epsilon$=306).

---

[1] $K = \dfrac{\epsilon}{M.W.}$ where $\epsilon$ is the molecular extinction coefficient and M.W. is the molecular weight.

The $F^{19}$ n-m-r spectrum, measured in nitrobenzene solution, showed a single peak at −5690 c.p.s. (56.4 mc.; 1,2-dichlorotetrafluoroethane=0).

EXAMPLE IV

*Cis- and trans-9,10-bis(difluoroamino)-9,10-difluoro-9,10-dihydroanthracene*

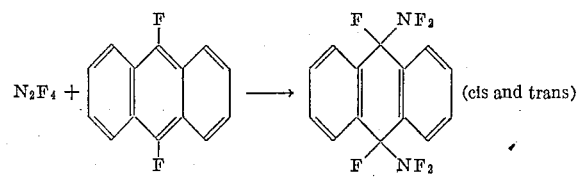

An 8-cc. "Hastelloy" C-lined shaker tube was charged with 4.0 g. of 9,10-difluoroanthracene, 8.8 g. of benzene, and 3.0 g. of $N_2F_4$. The tube was sealed, heated at 45° C. with shaking for two hours, cooled, and opened. The benzene was evaporated under reduced pressure to give 5.0 g. of a mixture of cis- and trans-9,10-bis(difluoroamino)-9,10-difluoro-9,10-dihydroanthracene as a solid. Recrystallization of the mixture from hexane gave 1.8 g. of pure, crystalline cis isomer melting at 166–167.5° C. This isomer liberated $N_2F_4$ when heated at 190° C. in a closed system.

*Analysis.*—Calcd. for $C_{14}H_8N_2F_6$: C, 52.84; H, 2.53; N, 8.81; F, 35.83. Found: C, 53.23; H, 2.78; N, 9.10; F, 34.81.

The infrared absorption spectrum (potassium bromide pellet) showed strong absorption at 7.63$\mu$, 7.77$\mu$, and 8.12$\mu$ (C—F) and at 9.5$\mu$, 10.85$\mu$, 11.30$\mu$, and 11.50$\mu$ ($NF_2$). The ultra-violet absorption spectrum, measured in ethyl alcohol solution, was characteristic of an ortho-disubstituted benzene, with maxima at 274 m$\mu$ ($\epsilon$=1120), 267 m$\mu$ ($\epsilon$=1040), and 262 m$\mu$ ($\epsilon$=790). The $F^{19}$ n-m-r spectrum (benzene solution) had a doublet centered at −5270 c.p.s. ($J_{F-F}$=7 c.p.s.) for the $NF_2$ group, the splitting being due to the adjacent fluorine, and triplet centered at +4650 c.p.s. ($J_{F-F}$=8 c.p.s.) for the C—F, the splitting being due to the adjacent $NF_2$ group (56.4 m.c.; 1,2-dichlorotetrafluoroethane=0). This product was assigned the cis configuration because of its relatively high melting point and low extinction coefficients ($\epsilon$), by analogy with the properties of cis-9,10-bis(difluoroamino)-9,10-dihydroanthracene (Example I).

Evaporation of the hexane solution remaining after the recrystallization and recrystallization of the residue from low-boiling petroleum ether gave 1.7 g. of pure, crystalline trans isomer, M.P. 123–124° C.

*Analysis.*—Calcd. for $C_{14}H_8N_2F_6$: C, 52.84; H, 2.53; N, 8.81; F, 35.83. Found: C, 53.37; H, 2.70; N, 9.01; F, 35.09.

The infrared absorption spectrum (potassium bromide pellet) showed strong absorption at 7.53$\mu$, 7.72$\mu$, and 8.21$\mu$ (C—F) and at 9.56$\mu$, 10.85$\mu$, 11.25$\mu$, and 11.50$\mu$ ($NF_2$). The ultra-violet absorption spectrum (ethyl alcohol solution) was characteristic of an ortho-disubstituted benzene, with maxima at 278 m$\mu$ ($\epsilon$=1480) and 270 m$\mu$ ($\epsilon$=1320). The $F^{19}$ n-m-r spectrum (benzene solution) had a doublet centered at −5310 c.p.s. ($J_{F-F}$=15 c.p.s.) corresponding to the $NF_2$ group, the splitting being due to the adjacent fluorine, and a triplet centered at +3495 c.p.s. ($J_{F-F}$=18 c.p.s.) for the C—F group, the splitting being due to the adjacent $NF_2$ group (56.4 mc.; 1,2-dichlorotetrafluoroethane=0). This product was assigned the trans configuration because of its relatively low melting point and high extinction coefficients, by analogy with the properties of trans - 9,10 - bis(difluoroamino)-9,10-dihydroanthracene (Example I).

The 9,10-difluoroanthracene used in this example was made by defluorination of 9,9,10,10-tetrafluoro-9,10-dihydroanthracene at 250° C. over steel wool in a closed system. The procedure was suggested by that of Patrick et al., U.S. 3,000,976. The tetrafluoro compound was prepared by the method of Hasek et al., J. Am. Chem. Soc., 82, 543 (1960).

Additional examples of 9,10-bis(difluoroamino)-9,10-dihydroanthracenes, toegther with the anthracene compounds from which they can be prepared by reaction with $N_2F_4$, are listed in Table I.

The ready availability of $N_2F_4$ from products of this invention is illustrated by the following example:

EXAMPLE A

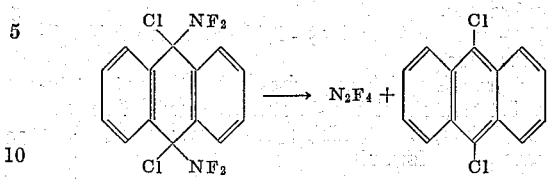

A glass reactor was charged with 0.5 g. of 9,10-dichloro-9,10-bis(difluoroamino)-9,10-dihydroanthracene and con-

TABLE I.—9,10-BIS(DIFLUOROAMINO)-9,10-DIHYDROANTHRACENES

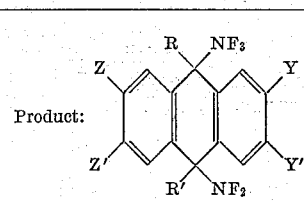

| Anthracene Reactant | R | R' | Y | Y' | Z' | Z |
|---|---|---|---|---|---|---|
| 2-Isopropylanthracene | H | H | i—$C_3H_7$ | H | H | H |
| 6-Chloro-2,3-dimethylanthracene | H | H | H | $CH_3$ | $CH_3$ | H |
| 9-Dodecylanthracene | $C_{12}H_{25}$ | H | H | H | Cl | H |
| 9-Fluoroanthracene | F | H | H | H | H | H |
| 9-Ethyl-2,7-dimethylanthracene | $C_2H_5$ | H | $CH_3$ | H | H | $CH_3$ |
| 9-Benzyl-2,3-dichloro-6,7-dimethylanthracene | $C_6H_5CH_2$ | H | Cl | Cl | $CH_3$ | $CH_3$ |
| 9,10-Dimethylanthracene | $CH_3$ | $CH_3$ | H | H | H | H |
| 9,10-Diisobutylanthracene | i—$C_4H_9$ | i—$C_4H_9$ | H | H | H | H |
| 9,10-Diphenethylanthracene | $C_6H_5CH_2CH_2$ | $C_6H_5CH_2CH_2$ | H | H | H | H |
| 9,10-Di-β-naphthylanthracene | β—$C_{10}H_7$ | β—$C_{10}H_7$ | H | H | H | H |
| 9-Hexyl-10-methylanthracene | $C_6H_{13}$ | $CH_3$ | H | H | H | H |
| 9-Isopentyl-10-phenylanthracene | i—$C_5H_{11}$ | $C_6H_5$ | H | H | H | H |
| 9-Cyclohexyl-10-phenylanthracene | $C_6H_{11}$ | $C_6H_5$ | H | H | H | H |
| 9-Chloro-10-ethylanthracene | Cl | $C_2H_5$ | H | H | H | H |
| 9-Benzyl-10-chloroanthracene | $C_6H_5CH_2$ | Cl | H | H | H | H |
| 2-Ethyl-9,10-dimethylanthracene | $CH_3$ | $CH_3$ | $C_2H_5$ | H | H | H |
| 2,7-Dichloro-9,10-dimethylanthracene | $CH_3$ | $CH_3$ | Cl | H | H | Cl |
| 2,3,9-Trimethyl-10-phenylanthracene | $CH_3$ | $C_6H_5$ | $CH_3$ | $CH_3$ | | |
| 2,3,6,7-Tetramethyl-9,10-diphenylanthracene | $C_6H_5$ | $C_6H_5$ | $CH_3$ | $CH_3$ | $CH_3$ | $CH_3$ |
| 2,3,9,10-Tetraphenylanthracene | $C_6H_5$ | $C_6H_5$ | $C_6H_5$ | $C_6H_5$ | H | H |
| 9,10-Dichloro-2-methylanthracene | Cl | Cl | $CH_3$ | H | H | H |

The products of this application have various utilities. Products that have hydrogen in the 9- or 10-position, e.g., the products of Example I and the first six products of Table I, give off hydrogen fluoride on heating. These products are thus useful for the generation or, in effect, the storage of hydrogen fluoride. They are also useful as etching agents for glass and metal surfaces, e.g., aluminum and zinc, whereby predetermined designs may be imparted thereto.

The products of the invention having no hydrogen in the 9- or 10-positions have the very useful property of serving as means for storing and transporting $N_2F_4$, which is of value as a polymerization initiator and an intermediate in the preparation of other useful nitrogen-fluorine compounds. $N_2F_4$ can be released from the products, or from solutions thereof, at any desired time, place, and rate simply by heating at a suitable temperature. Ordinarily, $N_2F_4$ must be stored and transported under pressure in metal cylinders. A steel cylinder weighing about 35 pounds is required for one pound of $N_2F_4$, and the gas under pressure presents an explosive hazard. By contrast, only 2–10 pounds of a product of this invention, and only 2–4 pounds of a preferred product, is required to give one pound of $N_2F_4$, the exact amount depending on the particular anthracene used, and the products can be stored and transported at atmospheric pressure and without hazard. While $N_2F_4$ is liberated in some cases only in closed systems, e.g., from the isomers of Example IV, this fact is immaterial since many $N_2F_4$ reactions are most desirably carried out in closed systems.

nected to a trap. The system was evacuated, the trap was cooled to −196° C., and the reactor was heated in an oil bath at 200–220° C. There was collected in the trap 0.15 g. (100%) of $N_2F_4$ containing minor amounts of NO and $N_2O$, which presumably resulted from a slight reaction of $N_2F_4$ with the glass apparatus. The material remaining in the glass reactor was pure 9,10-dichloroanthracene.

Since obvious modifications and equivalents in the invention will be evident to those skilled in the chemical arts, I propose to be bound solely by the appended claims.

The embodiments of the invention in which an exclusive property or privilege is claimed are defined as follows:

1. 9,10 - bis(difluoroamino) - 9,10 - dihydroanthracenes of the formula

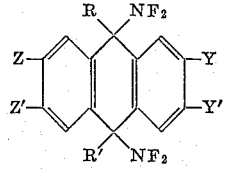

wherein: R and R' are selected from the group consisting of hydrogen, fluorine, chlorine and hydrocarbon of up to 12 carbons free of aliphatic unsaturation; and Y, Y', Z and Z' are selected from the group consisting of hydrogen, chlorine, lower alkyl and phenyl.

2. 9,10-bis(difluoroamino)-9,10-dihydroanthracene.

3. 9,10 - dichloro - 9,10 - bis(difluoroamino) - 9,10 - dihydroanthracene.

4. 9,10 - bis(difluoroamino) - 9,10 - diphenyl - 9,10 - dihydroanthracene.

5. 9,10 - bis(difluoroamino) - 9,10 - difluoro - 9,10 - dihydroanthracene.

6. The process which comprises contacting, at a temperature between about 20° C. and the dissociation temperature of the product, dinitrogen tetrafluoride and an anthracene of the formula

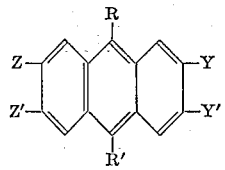

wherein: R and R' are selected from the group consisting of hydrogen, fluorine, chlorine and hydrocarbon of up to 12 carbons free of aliphatic unsaturation; and Y, Y', Z and Z' are selected from the group consisting of hydrogen, chlorine, lower alkyl and phenyl.

7. The process of claim 6 wherein the temperature is between about 20 and about 80° C.

8. The process which comprises contacting, at a temperature of about 20–80° C., dinitrogen tetrafluoride and anthracene.

9. The process which comprises contacting, at a temperature of about 20–80° C., dinitrogen tetrafluoride and 9,10-dichloroanthracene.

10. The process which comprises contacting, at a temperature of about 20–80° C., dinitrogen tetrafluoride and 9,10-diphenylanthracene.

11. The process which comprises contacting, at a temperature of about 20–80° C., dinitrogen tetrafluoride and 9,10-difluoroanthracene.

No references cited.

LORRAINE A. WEINBERGER, *Acting Primary Examiner.*

IRVING MARCUS, LEON ZITVER, *Examiners.*

UNITED STATES PATENT OFFICE
CERTIFICATE OF CORRECTION

Patent No. 3,190,894 June 22, 1965

Anestis L. Logothetis

It is hereby certified that error appears in the above numbered patent requiring correction and that the said Letters Patent should read as corrected below.

Column 2, line 63, for "($\epsilon$-2620)" read -- ($\epsilon$=2620) --; line 68, for "270D" read -- 2.70D --; column 3, line 50, for "or" read -- of --; column 4, line 20, for "8-cc." read -- 80-cc. --.

Signed and sealed this 28th day of December 1965.

(SEAL)
Attest:

ERNEST W. SWIDER
Attesting Officer

EDWARD J. BRENNER
Commissioner of Patents